Nov. 6, 1934.  C. S. ASH  1,979,598
ROAD VEHICLE
Filed Dec. 5, 1925    4 Sheets-Sheet 1
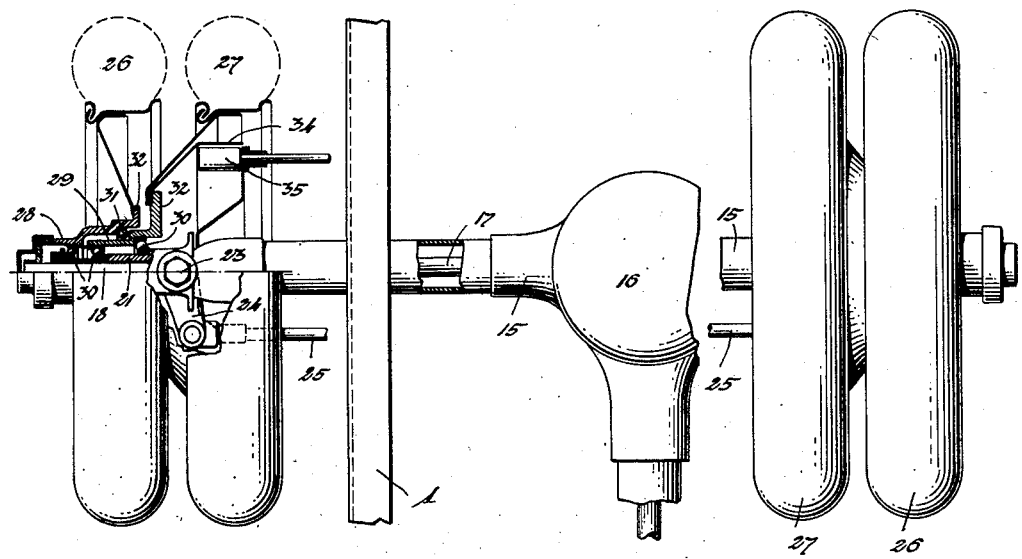
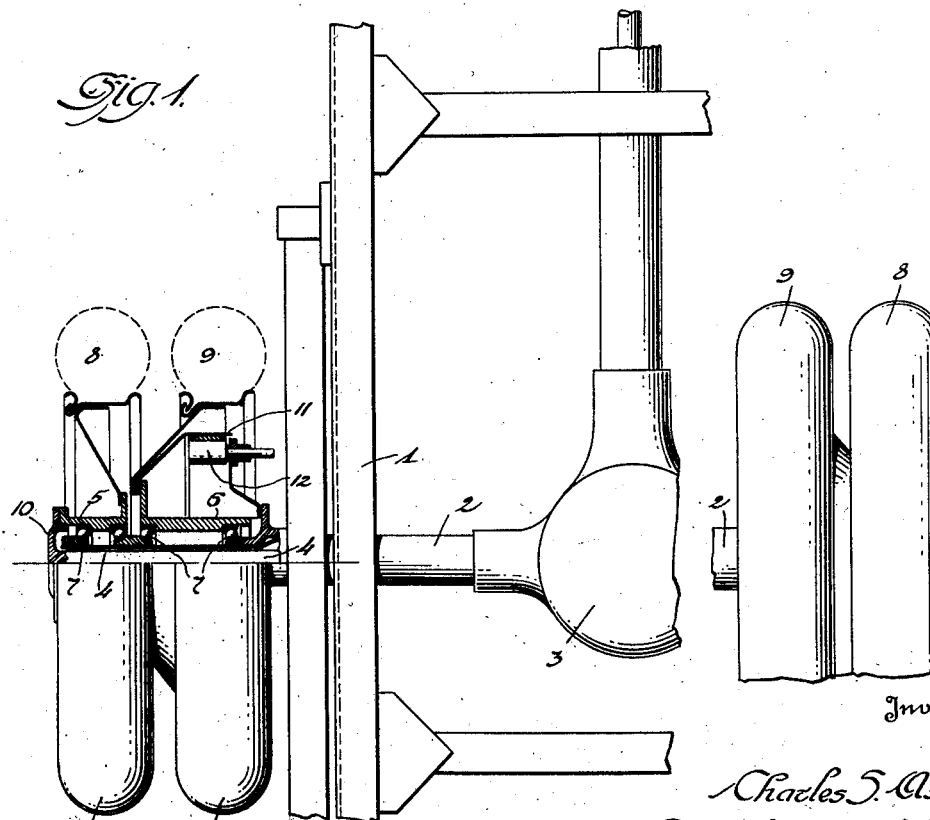
Fig. 1.
Inventor:
Charles S. Ash
By
Attorneys.

Nov. 6, 1934.   C. S. ASH   1,979,598
ROAD VEHICLE
Filed Dec. 5, 1925   4 Sheets-Sheet 4

Patented Nov. 6, 1934

1,979,598

UNITED STATES PATENT OFFICE 1,979,598

ROAD VEHICLE

Charles S. Ash, Royal Oak, Mich.

Application December 5, 1925, Serial No. 73,337

16 Claims. (Cl. 180—22)

In road vehicle constructions designed to carry heavy loads, and more particularly in motor-bus constructions, the use of dual wheels is particularly desirable in order that the load may be distributed over a greater number of tires and thus, where pneumatic tires are used, tires of less cross-sectional diameter may be employed, thereby avoiding the extreme drop occasioned upon deflation of a tire of large cross-sectional diameter and giving better ground contact to prevent skidding. It is becoming common practice to employ tandem wheels at the rear of large motor-buses to take the load and give added traction but such arrangement necessitates the installation of two axles, greatly increasing the cost of manufacture and complicating the construction, and it is also common practice to use dual wheels on the rear axle of such vehicles, the two wheels of each pair both being driving wheels and rigidly connected to turn together, but in either case single wheels are usually pivotally mounted at the ends of the front axle for steering purposes, although the use of tandem wheels at the front end of the vehicle has been proposed, but the construction is further complicated thereby as the employment of a pivoted truck is then necessary in order to provide for steering the vehicle.

Where single steering or front wheels are employed, the vehicle must necessarily be so designed as to bring a greater proportion of the load upon the rear wheels to avoid the use of front tires of extremely large cross-sectional area and to decrease the power required in steering, and there is always present the danger incident to deflation of these front tires and overloading of the same.

It is an object of the present invention to provide a dual wheel construction wherein each wheel of each pair is free to turn independently of the other wheel of the pair, whereby one wheel of the pair may be power driven or used for braking purposes while the other wheel of the pair may run free to carry a proportion of the load and prevent skidding. Further, if found desirable, driving power may be applied to one wheel of the pair and braking power to the other, and wheels so arranged are especially adapted for steering as said wheels may turn relatively in their pivotal movement in steering, thus greatly reducing steering resistance and making practical the use of dual wheels for the purpose. A further object is to provide a dual wheel construction whereby such wheels may be mounted for either driving or steering without the necessity for extensive changes in present motor vehicle design and whereby the carrying capacity of such vehicles may be increased and a better distribution of load effected and easier riding qualities secured. It is also an object to obviate danger incident to tire deflation and skidding, and to facilitate the steering of the vehicle. Another object is to provide a simple construction which is comparatively cheap to manufacture, efficient in operation, and provides a dual wheel mounting particularly applicable to front or other steering wheel arrangement, and has certain other new and useful features in the construction and arrangement of parts, all as hereinafter more fully described.

With the above and other ends in view the invention consists in so mounting a pair of wheels upon the end of an axle that they may rotate relatively and independently and also in the application of such arrangement to the steering of the vehicle. The invention further consists in the construction of wheel mounting and arrangement of independently rotatable wheels relative to the axis of pivotal movement of the wheels in their steering movement. The invention also consists in the construction, arrangement and combination of elements in a road vehicle, and in certain other new and useful features, all as hereinafter more fully set forth and particularly pointed out in the appended claims, reference being had to the accompanying drawings, in which—

Figure 1 is a plan view of a portion of a motor-vehicle chassis with the dual wheels shown partly in section to more clearly disclose the construction;

Figure 2:
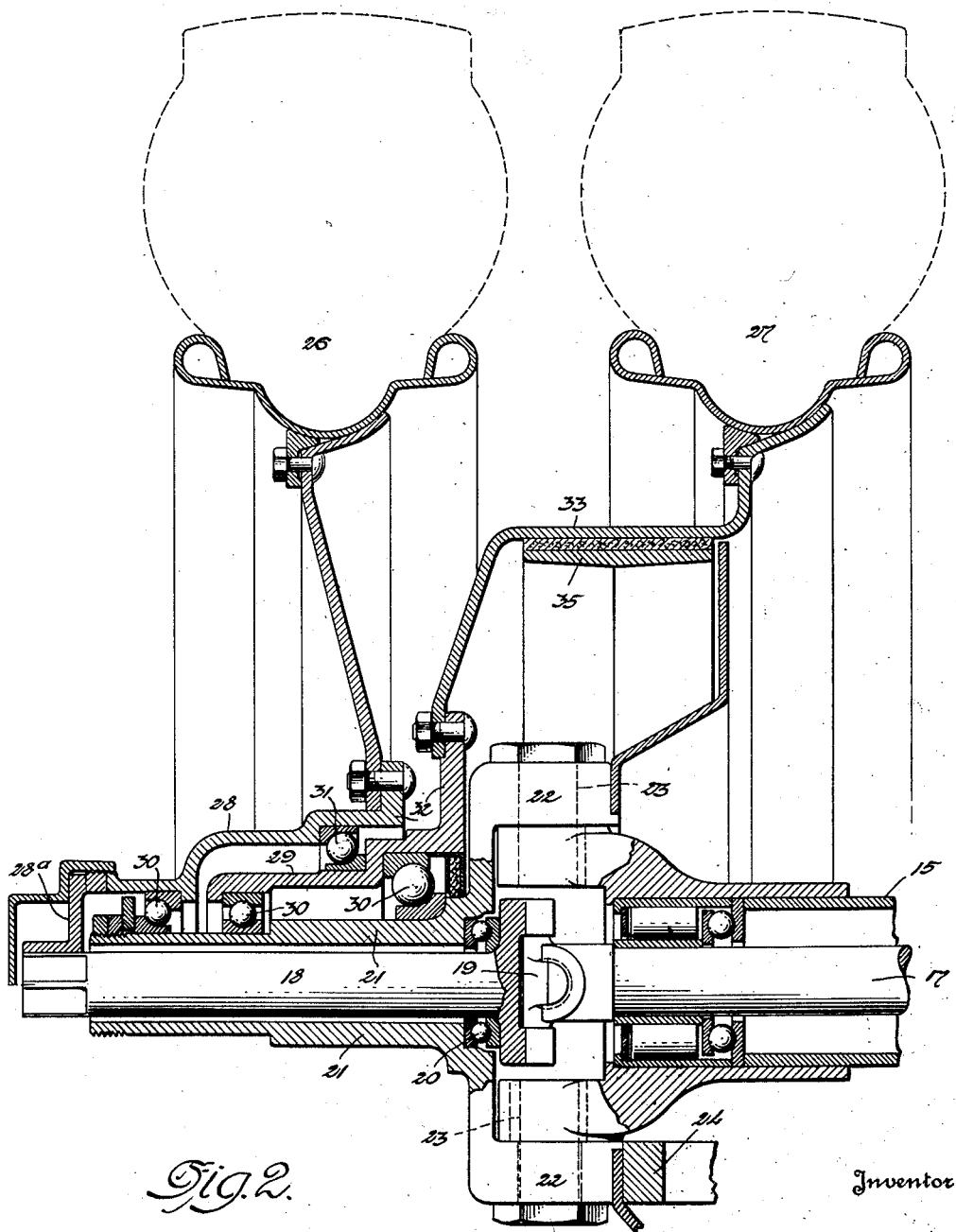
Fig. 2 is a sectional detail, showing a slight modification of the front wheel construction shown in Fig. 1 and showing in longitudinal section, a steering wheel hub and a pair of wheels mounted thereon.

As shown in Fig. 1, a chassis frame 1 is supported at its rear end in any suitable manner upon a rear axle casing 2 having the usual differential gear casing 3 and live or driving axle 4. Mounted upon each projecting end of the casing 2 is a pair of hub members 5 and 6 with suitable bearings 7 interposed between the hubs and casing end portion so that the hubs may turn freely and independently of each other upon the casing, and attached to these hub members in any suitable manner, is a pair 8 and 9 of traction or ground wheels, the outer wheel 8 of the pair and its hub 5 being positively driven by means of a head 10 on the outer end of the shaft 4, which head is bolted or otherwise rigidly secured to the hub 5 to transmit motion from the live axle to the hub of the outer wheel 8 and propel the vehicle, the inner wheel 9 being free to turn independently of the outer wheel. This inner wheel 9 may be provided with a brake drum 11 to be engaged by a brake band or shoe 12 for the purpose of retarding rotation of the wheel, any suitable arrangement of brake drum and brake mechanism being provided.

Figure 3:
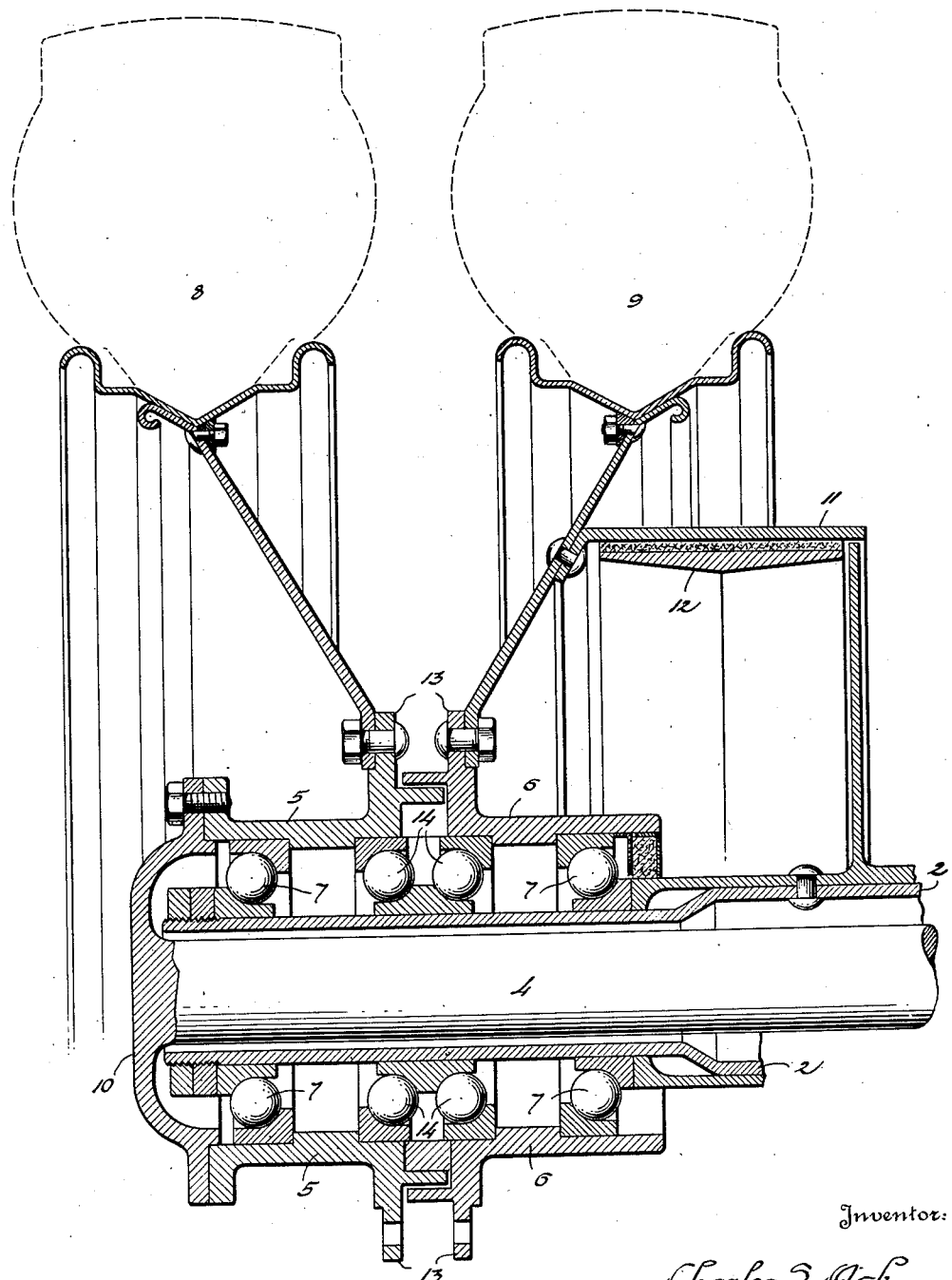
Fig. 3 is a similar sectional detail showing independently rotatable dual wheels applied to a motor vehicle rear axle.

As shown more in detail in Fig. 3, the adjacent ends of the hubs 5 and 6 may be formed with outwardly extending flanges 13 for the attachment thereto of the webs or disk portions of the wheels and if found desirable, a thrust bearing 14 may be interposed between the adjacent ends of the hubs so that said inner wheel 9 may turn freely, independently of the outer wheel 8. One of the wheels of the pair may therefore be positively driven independently of the other and said other wheel may be provided with a brake drum for the application of braking power thereto, and thus, both wheels being in contact with the ground, the application of the brakes will not tend to cause the wheels to skid laterally in contact with the ground as the driven wheel is free to rotate during such application and maintain traction. Retarding or braking action may be applied to both wheels of the pair by operating the brake mechanism and at the same time retarding rotation of the live axle which will in turn retard rotation of the driven wheel. Ordinarily, however, one wheel simply rolls in contact with the ground while power is applied to the other and thus the tendency to cause skidding in stopping the vehicle is eliminated.

As shown in Fig. 1, the front end of the chassis frame 1 is supported upon a front axle casing 15 in any suitable manner and this axle casing, for the purpose of illustration, is provided with a differential gear casing 16 and a live or driving axle 17 to each end of which live axle is connected a stub shaft 18 by means of a universal joint 19 as shown in Fig. 2, said stub shafts being each supported by a bearing 20 within a spindle 21 which is connected to the end of the axle casing 15 by means of the usual fork 22 pivoted to said casing by the usual vertically disposed pivot pins 23 to turn upon the axis of said pins, which axis is co-incident with the pivotal axis of the universal joint 19 so that said spindle 21 and stub shaft 18 may turn freely upon the axis of said pivot pins 23 in steering the vehicle; said spindle being turned in steering, by means of an arm 24 connected in any suitable manner to said yoke 22, the rear end of said arm being connected in the usual manner to the like arm at the other end of the axle, by a rod 25 so that the two spindles will be turned in unison.

A pair of dual wheels 26 and 27 is mounted upon the steering spindle 21 by providing separate hubs 28 and 29 respectively for said wheels, which hubs are mounted to turn freely and independently of each other upon the spindle 21 by interposing bearings 30 between said hubs and spindle and providing a thrust bearing 31 between the adjacent ends of said bearings, all as shown more in detail in Fig. 2, and each hub member is formed with an outwardly extending flange 32 to which flanges the disk or web portions of the respective wheels are secured. The inner wheel 27 may be formed to provide a brake drum as shown at 33 in Fig. 2 or a separate member forming a drum may be attached to the wheel as shown at 34 in Fig. 1, and braking power to retard the rotation of the inner wheel may be applied to this drum in any suitable manner, as by the brake band or shoe 35. Driving power is applied from the stub shaft 18 to the hub 28 to drive the wheel 26, by a head 28a having a driving connection with said stub shaft and hub.

Figure 4:
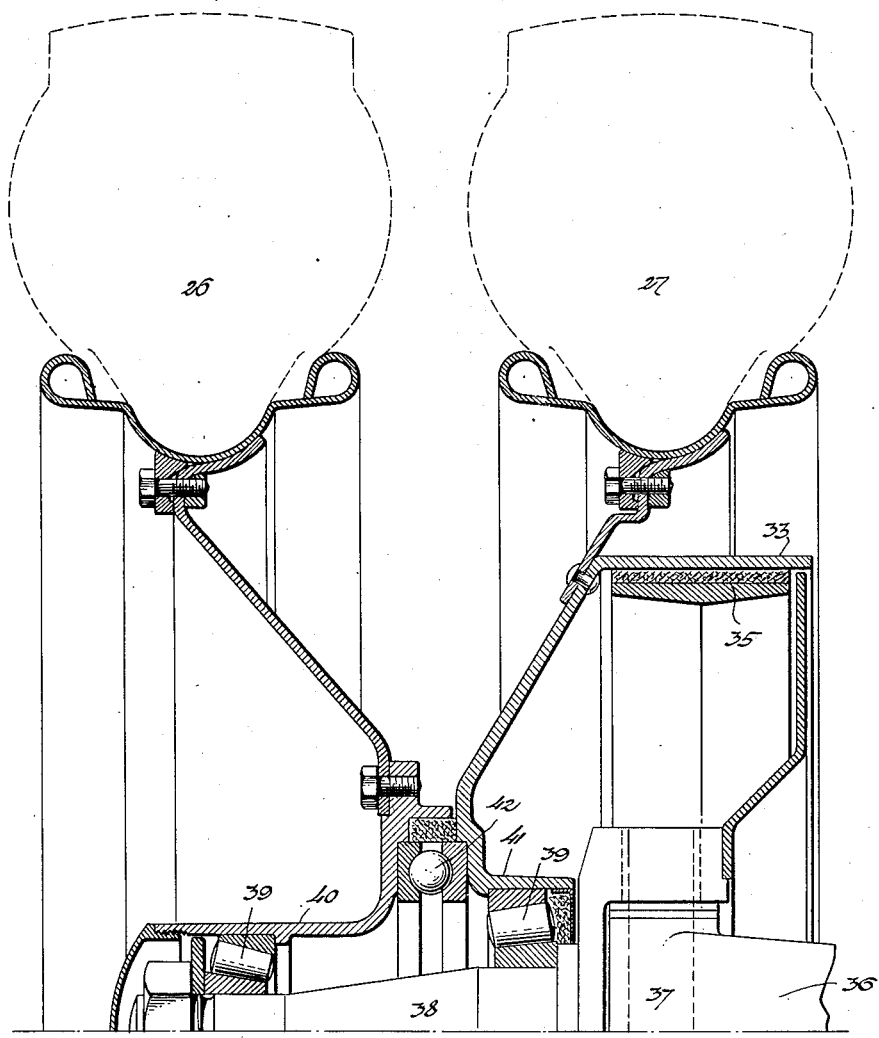
Fig. 4 is a sectional view similar to Fig. 2 showing a modified construction.

In Figs. 1 and 2, a front wheel drive for vehicles is illustrated, but the present invention may be applied as well to a construction in which the front or steering wheels of the vehicle turn freely, as illustrated in Fig. 4 of the drawings. In Fig. 4, the usual solid axle 36 is shown and this axle is provided at its ends with the usual steering knuckle 37 which pivotally connects the solid stub axle 38 thereto to turn thereon in the usual manner in steering the vehicle. In this arrangement the two wheels 26 and 27 are both mounted in any suitable manner to turn freely and independently of each other upon the stub 38, suitable bearings 39 being interposed between the separate hub portions 40 and 41 respectively of said wheels and said stub axle, with a thrust bearing 42 suitably arranged to take the end thrust so that said wheels may turn with freedom independently of each other. Any suitable hub and bearing arrangement may be employed to suit the particular conditions of installation, the construction shown, being merely illustrative of one manner of mounting these two wheels upon a single stub or steering axle.

By mounting two wheels upon each end of the steering or front axle of a motor vehicle, which wheels are free to rotate independently of each other, these two wheels may be turned in steering the vehicle, with comparatively small resistance as the inner wheel of the pair may be located in the plane of the axis of the steering knuckle as illustrated in Fig. 4, or the two wheels may be positioned, as shown in Fig. 2, one at each side of said plane, and as these wheels are free to rotate independently, one wheel may rotate faster than the other in the same or a reverse direction in describing their separate paths of travel about their common pivot axis in steering, and because of this independent free rolling contact with the ground, will offer small resistance to turning, in comparison to the extended ground contact area of the two tires, and as the tires carried by these two wheels contact the ground along spaced apart tread lines, the tendency to "shimmy" or turn from side to side is eliminated, making possible the use of a vertical steering knuckle pivot. By providing independently rotatable wheels in steering, the load carrying capacity of the front wheel tires of a heavy duty motor-bus is increased so that the load may be evenly distributed upon both front and rear axles, thus increasing the carrying capacity and giving a better balanced construction. Further, by providing dual front wheels, the cross-sectional area of the tires thereon may be reduced from that of a single tire designed to carry the same load and danger incident to the use of a single tire of large cross-sectional diameter is reduced and practically obviated by the employment of two tires, one of which will carry the load and prevent dangerous drop should the other become deflated.

Where dual front wheels are arranged with one wheel at one side of the steering knuckle axis and the other wheel at the opposite side thereof as shown in Fig. 2, ease in steering is secured as the inner wheel of the pair is free to turn in a direction opposite to that of the other, and both wheels simply roll in contact with the ground. There is also great advantage where front or steering wheel brakes are employed, in applying such braking resistance to one wheel only of each pair, as the other wheel in free rolling contact with the ground will maintain traction and prevent skidding. Where front or steering wheel drive is employed it is of great advantage to drive one wheel of each pair and permit the other to roll freely in contact with the ground or act separately to check forward progress of the vehicle by brake application thereto.

In event of deflation of a tire on a driving wheel at one end of the axle, it is obvious that by providing a differential lock, the vehicle could be propelled by the driving wheel at the other end of the axle, the load being taken by the free running wheel of the pair, one tire of which had become deflated, and it is also obvious that if found desirable, means may be provided for locking the two wheels of each pair together so that both wheels will be driven and thus afford added traction in case of emergency.

Any suitable wheel construction may be used in connection with the present wheel mounting arrangement which is adaptable to one or both axles or any form of road vehicle, but the application of which to the front or steering axle is particularly advantageous, and the hub construction may be varied to suit the conditions of installation, it being understood that the particular constructions and arrangements shown and described are merely illustrative of embodiments of the present invention.

Having thus fully described my invention, what I claim is:—

1. The combination with a vehicle axle including end members pivotally connected thereto to turn upon upwardly extending axes in steering the vehicle, a plurality of ground wheels mounted upon each of said end members for rotation thereon independently of each other, said wheels being so positioned relative to said axis of turning movement of said end member upon which they are mounted, that said wheels will have independent rolling contact with the ground at each side of the said axis.

2. The combination with a vehicle axle including end members, each pivotally connected to an end of said axle to turn upon an upwardly extending axis in steering the vehicle, of a plurality of ground wheels mounted upon each of said end members for rotation thereon independently of each other and with said axis positioned between the plane of the outer side of the outer wheel and the plane of the inner side of the inner wheel of each plurality of wheels, said wheels being provided with rims, and pneumatic tires mounted on said rims.

3. In a motor vehicle, the combination of front and rear axles each having wheel mounting ends, a plurality of wheels forming a set mounted upon each of said mounting ends, a separate bearing for each wheel of each set, the wheels of each set being mounted upon said bearings intermediate the ends of said end mounting members for independent rotation upon a common axis and for applying the load to said axle ends between the planes of the outer side of the outer wheel and the inner side of the inner wheel of each set, and means for driving one wheel of each set.

4. In a road vehicle having front and rear axles, said front axle having wheel mounting end members pivotally attached to the ends of said axle to turn upon upwardly extending axes in steering the vehicle, a pair of wheels mounted upon each end of the rear axle for independent rotation of the wheels of each pair upon a common axis coincident with the longitudinal axis of said axle, a pair of wheels mounted upon each of said front axle pivoted end members for independent rotation of the wheels of each pair thereon upon a common axis coincident with the longitudinal axis of each end member, the pivot of connection of each end member to its axle being positioned between the planes of the outer side of the outer wheel and the inner side of the inner wheel of each pair of wheels thereon, the wheels of each pair being spaced apart and each wheel being provided with a separate pneumatic tire.

5. In a road vehicle having front and rear tubular axles, driving shafts in said axles, said front axle having wheel mounting end members pivotally attached to the ends of said axle to turn upon upwardly extending axes in steering the vehicle, a pair of wheels mounted upon each end of the rear axle for independent rotation of the wheels of each pair upon a common axis coincident with the longitudinal axis of said axle, a pair of wheels mounted upon each of said front axle pivoted end members for independent rotation of the wheels of each pair thereon upon a common axis coincident with the longitudinal axis of each end member, the pivot of connection of each end member to the front axle being positioned between the planes of the outer side of the outer wheel and the inner side of the inner wheel of each pair of wheels thereon, the outer wheel of all of the pairs of wheels being connected to said shafts in said axles, and means on the inner wheel of each pair of wheels for retarding rotation.

6. The combination with a vehicle axle including an end member pivotally connected thereto to turn upon an upwardly extending axis in steering the vehicle, a plurality of ground wheels mounted upon said end member for rotation thereon independently of each other, one of said wheels being mounted upon said end member to contact the ground at one side of said upwardly extending axis and the other of said wheels being mounted upon said end member to contact the ground at the opposite side of said axis, said axis being positioned between the planes of the outer side of the outer wheel and the plane of the inner side of the inner wheel to apply the load to said member between said planes of said wheels, means for retarding rotation of the inner of said wheels, and means for driving the outer wheel of said wheels.

7. In a road vehicle, the combination of a tubular axle, a drive shaft in said axle, a pair of tubular hub members mounted upon an end of said axle and independently rotatable thereon with the outer of said members connected to said shaft and driven thereby, a wheel body carried by each hub member, said wheel bodies being dished laterally in opposite directions and secured to the adjacent ends of said hub members, rims mounted upon the peripheries of said wheel bodies and spaced apart by the dishing of said bodies, and braking means within the dish of said inner of said wheels.

8. In a road vehicle, the combination of an axle, a pair of tubular hub members mounted for free rotation upon an end of said axle and independently rotatable, a wheel body mounted upon and secured to the outer of said pair of hub members, means for driving said body, a wheel body mounted upon the inner of said pair of hub members and secured to the outer end of said member adjacent said outer member of the pair, said last named body being dished laterally toward the inner end of said hub member to which it is secured, and means surrounding said last named hub member within the offset of said wheel body attached thereto, for retarding rotation of said wheel body.

9. In a road vehicle, the combination with a front axle having means pivotally arranged for steering the vehicle, a rear axle, a group of wheels mounted for independent rotation upon a common axis upon the outer ends of each of said front and rear axles, means for driving some of said wheels, and means associated with each of said front and rear axles and applied to one of said wheels of each of said groups for retarding rotation of said wheels to which said means is applied.

10. In a road vehicle, the combination of a front axle having pivotal end portions forming wheel supports and arranged for pivotal movement in steering the vehicle, a rear axle having end portions forming wheel supports, a group of independently rotatable ground wheels mounted for rotation upon each of said end portions of each of said axles to turn upon a common axis coincident with the longitudinal axis of each of said portions, and means applied to certain of said wheels of each group for imparting rotation to certain wheels only of said groups.

11. In a road vehicle, the combination with a front axle having means pivotally arranged for steering the vehicle, a rear axle, a group of wheels mounted for independent rotation upon a common axis upon the outer ends of each of said front and rear axles, means for applying torque to one of said wheels of each of said groups for driving the same, and means for retarding rotation of another wheel of each group of wheels.

12. A dual wheel assembly comprising, in combination, a spindle, a pair of transverse spaced apart rotary bearings mounted upon said spindle, a vertical thrust bearing intermediate said rotary bearings, and an inner and an outer wheel hub journalled upon said transverse bearings and having telescoped extensions.

13. A dual wheel assembly comprising, in combination, a spindle, an inner and an outer hub mounted for independent rotation upon said spindle upon spaced apart bearings, a thrust bearing intermediate said supporting bearings adapted to take the thrust of each, radial flanges about the outer periphery of each of said hubs.

14. A dual wheel assembly comprising, in combination, a spindle, a pair of transversely spaced apart rotary bearings mounted upon said spindle, a thrust bearing intermediate said rotary bearings, and an inner and an outer wheel hub journalled upon said transverse bearings and having overlapped portions.

15. A dual wheel assembly comprising, in combination, a spindle, a wheel hub mounted thereon, a second wheel hub journalled thereon for rotation independently of the first hub and having a portion overlapping a portion of the first hub, and a bearing intermediate the extremities of the hub assembly for taking the axial thrust of each hub.

16. A dirigible mechanism comprising a plurality of wheels, a spindle, means to journal the wheels independently on the spindle, and means to mount the spindle for turning about an axis passing between the wheels at the points of contact of the wheels with the road.

CHARLES S. ASH.